(12) United States Patent
Hisamatsu

(10) Patent No.: US 8,991,944 B2
(45) Date of Patent: Mar. 31, 2015

(54) CRAWLER BUSHING AND CRAWLER LINK DEVICE

(75) Inventor: Kenichi Hisamatsu, Hirakata (JP)

(73) Assignee: Komatsu Ltd., Tokyo (JP)

( * ) Notice: Subject to any disclaimer, the term of this patent is extended or adjusted under 35 U.S.C. 154(b) by 121 days.

(21) Appl. No.: 13/823,093

(22) PCT Filed: Nov. 29, 2011

(86) PCT No.: PCT/JP2011/077537
§ 371 (c)(1),
(2), (4) Date: Mar. 13, 2013

(87) PCT Pub. No.: WO2012/073956
PCT Pub. Date: Jun. 7, 2012

(65) Prior Publication Data
US 2013/0169034 A1     Jul. 4, 2013

(30) Foreign Application Priority Data

Dec. 1, 2010  (JP) .................................. 2010-268537

(51) Int. Cl.
*B62D 55/088* (2006.01)
*B62D 55/21* (2006.01)

(52) U.S. Cl.
CPC ............ *B62D 55/0887* (2013.01); *B62D 55/21* (2013.01)
USPC ............................. 305/104; 305/106; 305/202

(58) Field of Classification Search
CPC ... B65D 55/0887; B65D 55/205; B65D 55/21
USPC ......... 305/100, 103, 104, 105, 106, 200, 202, 305/203, 204; 277/364, 377, 381, 382, 402
See application file for complete search history.

(56) References Cited

U.S. PATENT DOCUMENTS 3,392,984 A * 7/1968 Reinsma et al. ............... 277/380
3,801,163 A * 4/1974 Khuntia ......................... 305/103
(Continued)

FOREIGN PATENT DOCUMENTS

DE      3321152 A1    12/1984
DE      3432852 C1    10/1985
(Continued)

OTHER PUBLICATIONS

Japanese Office Action dated Apr. 30, 2013 in counterpart Japanese Application No. 2010-268537.
(Continued)

*Primary Examiner* — Kip T Kotter
(74) *Attorney, Agent, or Firm* — Holtz, Holtz, Goodman & Chick PC

(57) ABSTRACT

To provide a crawler bushing and a crawler link device that can maintain a sealing function stably on a long-term basis and permits easy maintenance for recovery of the sealing function. The bushing includes: crawler bushing body (31) including large-diameter cylindrical part (31a) defining an intermediate section along axis (O) and small-diameter cylindrical part (31b) which defines an end section along axis (O) and is smaller in diameter than large-diameter cylindrical part (31a); elastic ring (32) mounted to an outer periphery of small-diameter cylindrical part (31b); seal ring (33) which is formed with seal contact end face (37) at its outer end and coupled to small-diameter cylindrical part (31b) through elastic ring (32); reverse tapered surface (36) and mountain-shaped projection (35) for preventing outward movement of elastic ring (32) along axis (O) of small-diameter cylindrical part (31b); and tongue-shaped projection (39) and reverse tapered surface (40) for preventing outward movement of seal ring (33) along axis (O) of small-diameter cylindrical part (31b).

16 Claims, 10 Drawing Sheets

(56) References Cited

U.S. PATENT DOCUMENTS

| | | | |
|---|---|---|---|
| 4,295,654 A * | 10/1981 | Kawamura et al. | 277/380 |
| 4,504,066 A | 3/1985 | Horl | |
| 4,819,999 A * | 4/1989 | Livesay et al. | 305/103 |
| 5,374,115 A * | 12/1994 | Ketting | 305/103 |
| 5,826,884 A * | 10/1998 | Anderton et al. | 277/396 |
| 5,994,664 A * | 11/1999 | Anderton et al. | 219/121.64 |
| 6,102,408 A | 8/2000 | Anderton et al. | |
| 6,105,969 A * | 8/2000 | Anderton et al. | 277/405 |
| 6,390,572 B1 * | 5/2002 | Idetsu et al. | 305/103 |
| 7,467,509 B2 * | 12/2008 | Yamane et al. | 59/4 |
| 8,113,597 B2 | 2/2012 | Grenzi | |
| 2010/0090523 A1 | 4/2010 | Grenzi | |
| 2012/0119567 A1 * | 5/2012 | Johannsen et al. | 305/103 |

FOREIGN PATENT DOCUMENTS

| | | |
|---|---|---|
| JP | 59-100685 U | 7/1984 |
| JP | 1-114387 U | 8/1989 |
| JP | 02112591 U | 9/1990 |
| JP | 11051196 A | 2/1999 |
| JP | 2010-052596 A | 3/2010 |
| JP | 2010516560 A | 5/2010 |

OTHER PUBLICATIONS

Japanese Office Action dated Jul. 9, 2013 in counterpart Japanese Application No. 2010-268537.

International Search Report (ISR) dated Jan. 10, 2012 issued in parent International Application No. PCT/JP2011/077537.

International Preliminary Report on Patentability (IPRP) dated Jun. 13, 2013 (in English) issued in International Application No. PCT/JP2011/077537.

German Office Action dated Dec. 1, 2014 issued in counterpart German Application No. 112011104003.2.

* cited by examiner 10 (a)

10 (b)

CRAWLER BUSHING AND CRAWLER LINK DEVICE

TECHNICAL FIELD

The present invention relates to a crawler bushing and a crawler link device that are suitable for use in a crawler belt mounted to a work vehicle such as a bulldozer or a hydraulic excavator.

BACKGROUND ART

A conventional sealing device for providing a seal between a crawler bushing and a crawler link of such a crawler belt is constructed of a seal contact end face of the crawler bushing and a seal member which is inserted in the crawler link to abut on the seal contact end face. This sealing device has its service life often determined by wear of the seal contact end face of the crawler bushing, rather than wear of the seal member. Thus, a measure against the wear of the seal contact end face of the crawler bushing needs to be taken to improve the seal service life.

An example of the crawler bushing having the seal contact end face with wear resistance is disclosed in patent document 1.

As shown in FIG. 10(a), plate 102 which underwent wear-resistant coating is attached to the seal contact end face of crawler bushing 101 of patent document 1 with adhesive 103. In crawler link device 100 equipped with this crawler bushing 101, seal member 105 inserted in crawler link 104 makes contact with wear-resistant plate 102, whereby the wear of the seal contact end face of crawler bushing 101 is suppressed.

However, this crawler link device 100 problematically faces time-consuming replacement of wear-resistant plate 102 which is attached to crawler bushing 101 with adhesive 103.

Accordingly, crawler bushing 111 disclosed, for example, in patent document 2 is conceivably adopted.

As shown in FIG. 10(b), crawler bushing 111 of patent document 2 is provided with annular recess 112 in its end face, and corrosion-resistant annular insert member 114 having corrosion resistance is inserted into this recess 112 via elastic ring 113. In crawler link device 110 equipped with this crawler bushing 111, seal member 116 inserted in crawler link 115 makes contact with corrosion-resistant annular insert member 114, whereby the wear of the seal contact end face of crawler bushing 111 is suppressed. It is to be noted that when inserted into recess 112, corrosion-resistant annular insert member 114 deforms elastic ring 113 by giving ring 113 a slight squeeze. For this reason, corrosion-resistant annular insert member 114 experiences resilience from elastic ring 113 in response to the squeeze and is thus urged in a sealing direction, that is, in the direction of arrow P pointing outward along an axis of crawler bushing 111.

According to this crawler link device 110, corrosion-resistant annular insert member 114 is simply squeezed into recess 112 of crawler bushing 111 via elastic ring 113, so that insert member 114 can be replaced with ease.

However, the resilience of elastic ring 113 that is exerted on corrosion-resistant annular insert member 114 is strong in this crawler link device 110. Accordingly, insert member 114 presses seal member 116 with excessive force. This causes damage and early wear to seal member 116 which as a result has an impaired sealing function. Consequently, oil leakage may problematically occur.

RELATED ART DOCUMENTS

Patent Documents

Patent Document 1: U.S. Pat. No. 6,102,408
Patent Document 2: U.S. Patent Application Publication No. 2010/0090523

SUMMARY OF THE INVENTION

Problems to be Solved by the Invention

In view of the problems mentioned above, the present invention aims to provide a crawler bushing and a crawler link device that can maintain a sealing function stably on a long-term basis and permits easy maintenance for recovery of the sealing function.

Means for Solving the Problems

To achieve the above-object, a crawler bushing according to a first aspect of the present invention, having a seal contact end face to be in contact with a seal member disposed axially adjacent to the crawler bushing includes:
a crawler bushing body having a large-diameter cylindrical part defining an axially intermediate section of the crawler bushing body and a small-diameter cylindrical part having a smaller diameter than that of the large-diameter cylindrical part and defining an axially end section of the crawler bushing body;
an elastic ring mounted to an outer periphery of the small-diameter cylindrical part:
a seal ring attached to the small-diameter cylindrical part through the elastic ring, the seal ring being formed with the seal contact end face at an outer end thereof;
a first tapered surface on the outer periphery of the small-diameter cylindrical part, the first tapered surface spreading radially outward while extending axially outward; and
a second tapered surface on an inner periphery of the seal ring, the second tapered surface narrowing radially inward while extending axially inward.

According to a second aspect of the invention, it is preferable that the crawler bushing further includes a projection at an axially outer end of the first tapered surface, the projection projecting radially outward for locking the elastic ring.

According to a third aspect of the invention, it is preferable that the crawler bushing further includes a projection at an axially inner end of the seal ring, the projection being adjacent to the second tapered surface and projecting radially inward to be locked by the elastic ring.

According to a fourth aspect of the invention, it is preferable that the crawler bushing further includes a circumferentially extending groove formed in an inner end surface of the seal ring.

According to a fifth aspect of the invention, it is preferable that an outside diameter of the seal ring is substantially equal to an outside diameter of the large-diameter cylindrical part.

According to a sixth aspect of the invention, it is preferable that the elastic ring is disposed between the seal ring and the crawler bushing body and contacts the first tapered surface and the second tapered surface.

A crawler link device according to a seventh aspect of the invention is a crawler link device comprising:
crawler links overlapping each other at respective ends thereof and coupled to each other by means of a link pin and a crawler bushing that are disposed coaxially, and a seal member inserted to be axially adjacent to the crawler bushing, wherein the crawler bushing according to first to sixth invention is adopted in the crawler link device.

Advantages of the Invention

In the crawler bushing of the first aspect of the invention, the first tapered surface prevents the elastic ring, which is mounted to the small-diameter cylindrical part of the crawler bushing body, from moving axially outward, and the second tapered surface prevents the seal ring, which is coupled to the small-diameter cylindrical part of the crawler bushing body through the elastic ring, from moving axially outward. Therefore, the seal ring, together with the elastic ring, is firmly secured to the crawler bushing body even when the seal ring experiences resilience from the elastic ring in response to a squeeze. For this reason, the seal member can maintain a stable sealing function on a long-term basis without being pressed by excessive force of the seal ring.

With regard to replacement of the seal ring, the seal ring can be removed easily from the crawler bushing body by detaching the seal ring from the crawler bushing body against locking force of the first tapered surface or the second tapered surface, and the seal ring can be mounted easily to the crawler bushing body by pushing the seal ring toward the crawler bushing against the resilience from the elastic ring in response to the squeeze. In this way, maintenance for recovery of the sealing function can be carried out with ease.

The crawler bushing of the first aspect of the invention can maintain the stable sealing function on a long-term basis and also enables easy maintenance for the recovery of the sealing function. Moreover, the crawler bushing is capable of preventing the axially outward movement of the elastic ring with its extremely simple structure.

The respective structures of the second and third aspects of the invention are extremely simple, and adopting these structures can prevent the axially outward movement of the seal ring.

Adopting the structure of the fourth aspect of the invention allows easy formation of the tapered surface and the projection which projects radially inward at the inner end of the seal ring to be locked by the elastic ring.

Adopting the respective structures of the fifth and sixth aspects of the invention permits simplification of the shape of the crawler bushing.

In the crawler link device of the seventh aspect of the invention, the crawler bushing of the first, second, third, fourth, fifth or sixth aspect of the invention is adopted as the crawler bushing on which the seal member is abutted, whereby the sealing function can be maintained stably on a long-term basis. Moreover, the crawler link device thus obtained allows the easy maintenance for the recovery of the sealing function.

DETAILED DESCRIPTION OF PREFERRED EMBODIMENTS

Concrete exemplary embodiments of a crawler bushing and a crawler link device according to the present invention are demonstrated hereinafter with reference to the accompanying drawings.

The embodiments described below are examples in which the invention is applied to a crawler bushing and a crawler link device that are mounted to a bulldozer. However, it goes without saying that the invention is not limited to the bulldozer and is applicable to work vehicles in general, including a hydraulic excavator equipped with a crawler bushing and a crawler link device.

Figure 1:
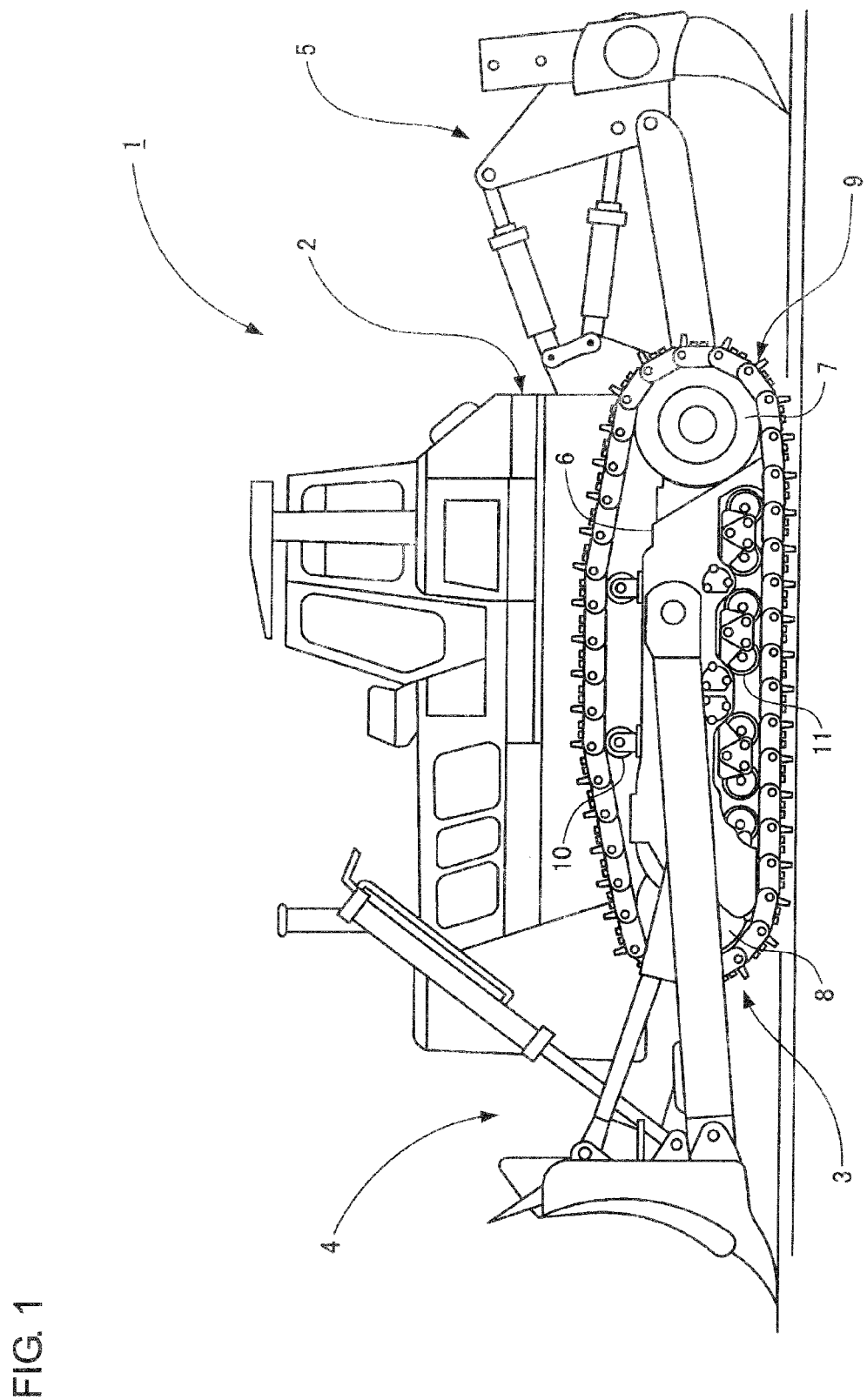
FIG. 1 is a side view of a bulldozer equipped with a crawler bushing and a crawler link device in accordance with a first exemplary embodiment of the present invention.

(First Exemplary Embodiment)
(Brief Description of a Bulldozer with Reference to FIG. 1)
Bulldozer 1 shown in FIG. 1 includes vehicle body 2. Right and left sides of vehicle body 2 are provided with respective crawler units 3 (only the left crawler unit is shown). In front of vehicle body 2, blade device (front implement) 4 is disposed, while ripper device (rear implement) 5 is disposed at the back of vehicle body 2. Blade device 4 of this bulldozer 1 performs dozing and earth carrying operations, while ripper device 5 performs breaking and digging operations.

(Brief Description of the Crawler Unit with Reference to FIG. 1)
Crawler unit 3 includes track frame 6 forming a framework of crawler unit 3. Track frame 6 is disposed in front of sprocket 7, which serves as a drive wheel supported at a rear part of vehicle body 2, and extends back and forth. Idler 8 is rotatably mounted to a front part of track frame 6 to serve as an idler wheel. Crawler belt 9 serving as an endless track is wound around idler 8 and sprocket 7 in the form of an ellipse. Above track frame 6, required carrier rollers 10 are provided to support from below crawler belt 9, which moves in a direction from sprocket 7 to idler 8 or in a reverse direction, thereby preventing crawler belt 9 from hanging down under its own weight and meandering. Beneath track frame 6, required track rollers 11 are provided to distribute the weight of the vehicle over crawler belt 9 as well as to prevent the meandering of crawler belt 9.

Figure 2:
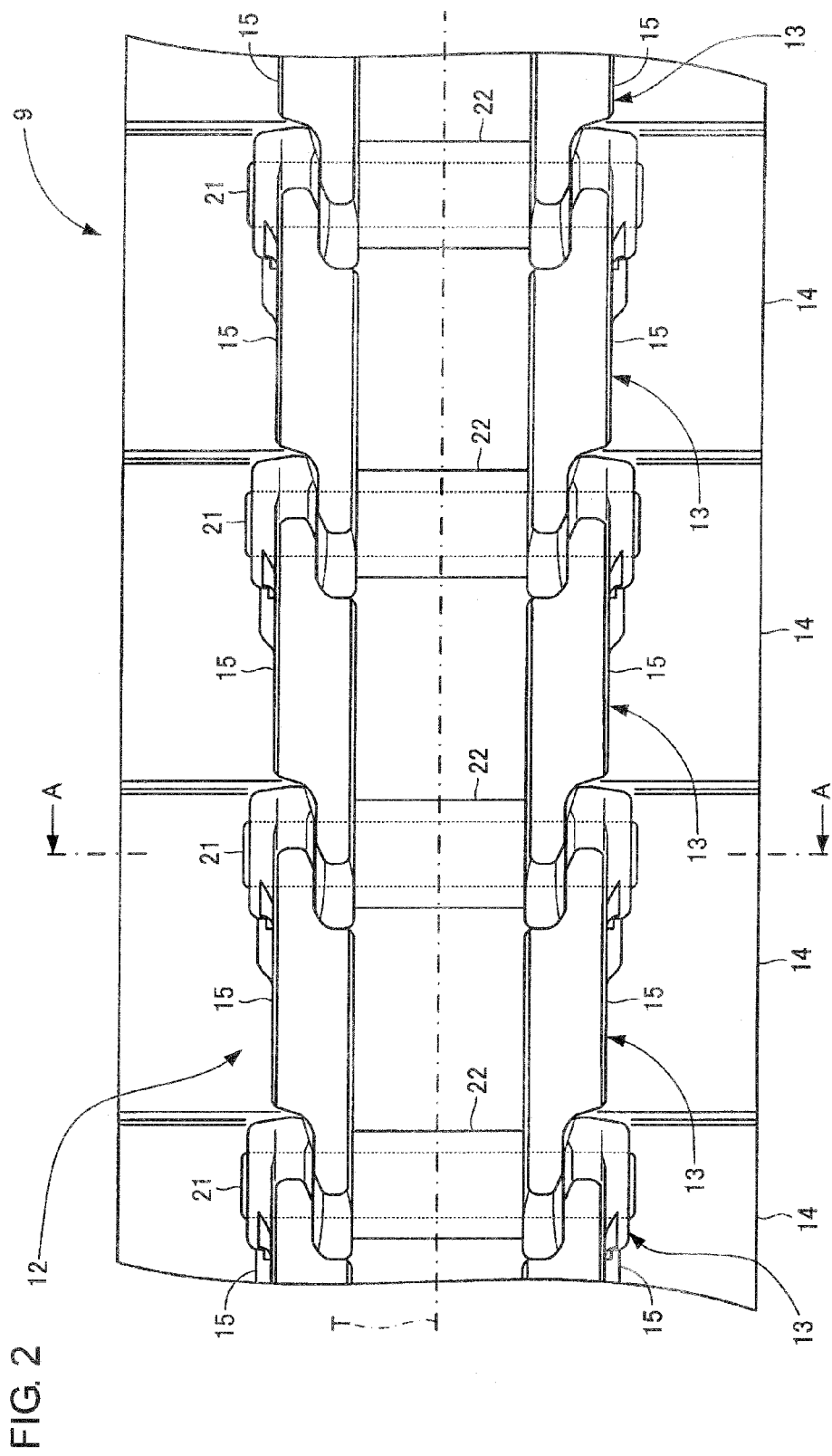
FIG. 2 is a plan view of a crawler belt.

(Brief Description of the Crawler Belt with Reference to FIG. 2)
As shown in FIG. 2, crawler belt 9 includes track chain 12.
Track chain 12 is constructed of a plurality of link assemblies 13 having their ends rotatably connected.
Track shoe 14 is fixed by bolting (not shown) to a ground contact surface of each link assembly 13.

(Description of the Link Assembly with Reference to FIG. 2)
Crawler link assembly 13 is constructed of a pair of crawler links 15 facing each other across center line T of track chain 12.

(Description of the Crawler Link with Reference to FIGS. 2 and 3)
As shown in FIG. 2, crawler link 15 is an offset link having one end offset in a direction away from center line T of track chain 12 relative to an opposite end.

Figure 3:
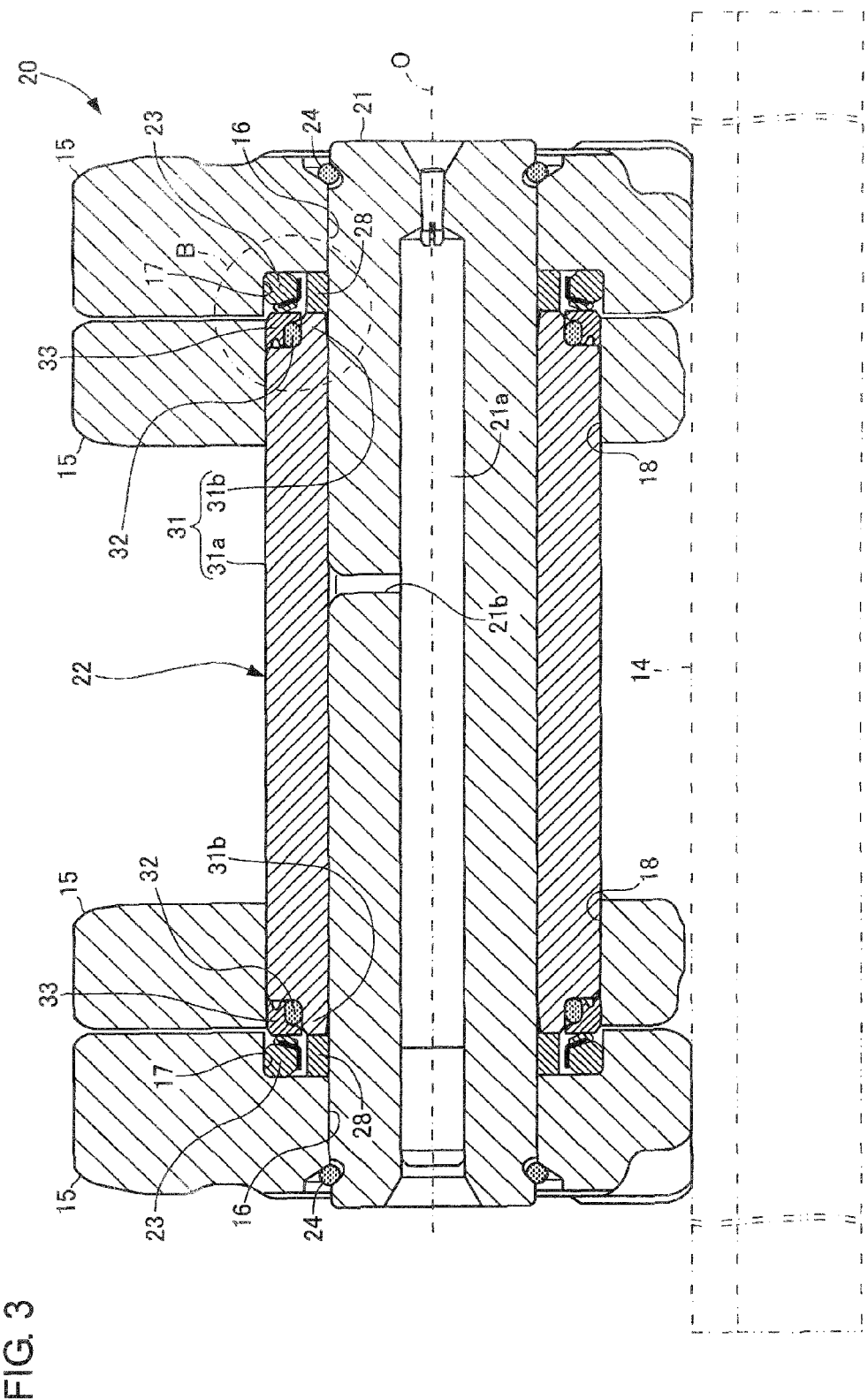
FIG. 3 is a sectional view taken along line A-A in FIG. 2.

As shown in FIG. 3, one of the crawler links 15 overlapping each other at their respective ends (i.e., outer crawler link 15 in FIG. 3) is formed with pin insertion hole 16 in its one end and inwardly opening counter bore 17 which surrounds pin insertion hole 16 to be concentric with pin insertion hole 16.

The other one of the crawler links 15 overlapping each other at their respective ends (i.e., inner crawler link 15 in FIG. 3) is formed with bushing insertion hole 18 in its opposite end.

(Brief Description of a Crawler Link Device with Reference to FIG. 3)

Crawler link device 20 of the first embodiment is constructed by coupling crawler links 15, 15, which overlap each other at their respective ends, by means of link pin 21 and crawler bushing 22 that are disposed to share the same axis O and inserting seal member 23 into counter bore 17 of crawler link 15 so that seal member 23 is disposed adjacently along axis O.

(Description of Respective Interferences of the Link Pin and the Crawler Bushing Relative to the Crawler Link with Reference to FIG. 3)

Link pin 21 is press-fitted into pin insertion hole 16 of crawler link 15. A relatively small interference is set between link pin 21 and pin insertion hole 16, so that link pin 21 cannot easily be inserted into and extracted from pin insertion hole 16.

Crawler bushing 22 is press-fitted into bushing insertion hole 18 of crawler link 15. A relatively small interference is also set between crawler bushing 22 and bushing insertion hole 18, so that crawler bushing 22 cannot easily be inserted into and extracted from bushing insertion hole 18.

(Description of the Link Pin with Reference to FIG. 3)

Link pin 21 is centrally formed with lubricant reservoir 21*a* for storing a lubricant. Also, link pin 21 is formed with continuous hole 21*b* communicating between lubricant reservoir 21*a* and an outer periphery of pin 21. The lubricant stored in lubricant reservoir 21*a* is delivered through continuous hole 21*b* to the outer periphery of pin 21 for lubrication between the outer periphery of link pin 21 and an inner periphery of crawler bushing 22.

Metal elastic ring 24 is interposed between an end of link pin 21 and a rim of pin insertion hole 16, thereby preventing leakage of the lubricant from between link pin 21 and crawler link 15.

Figure 4:
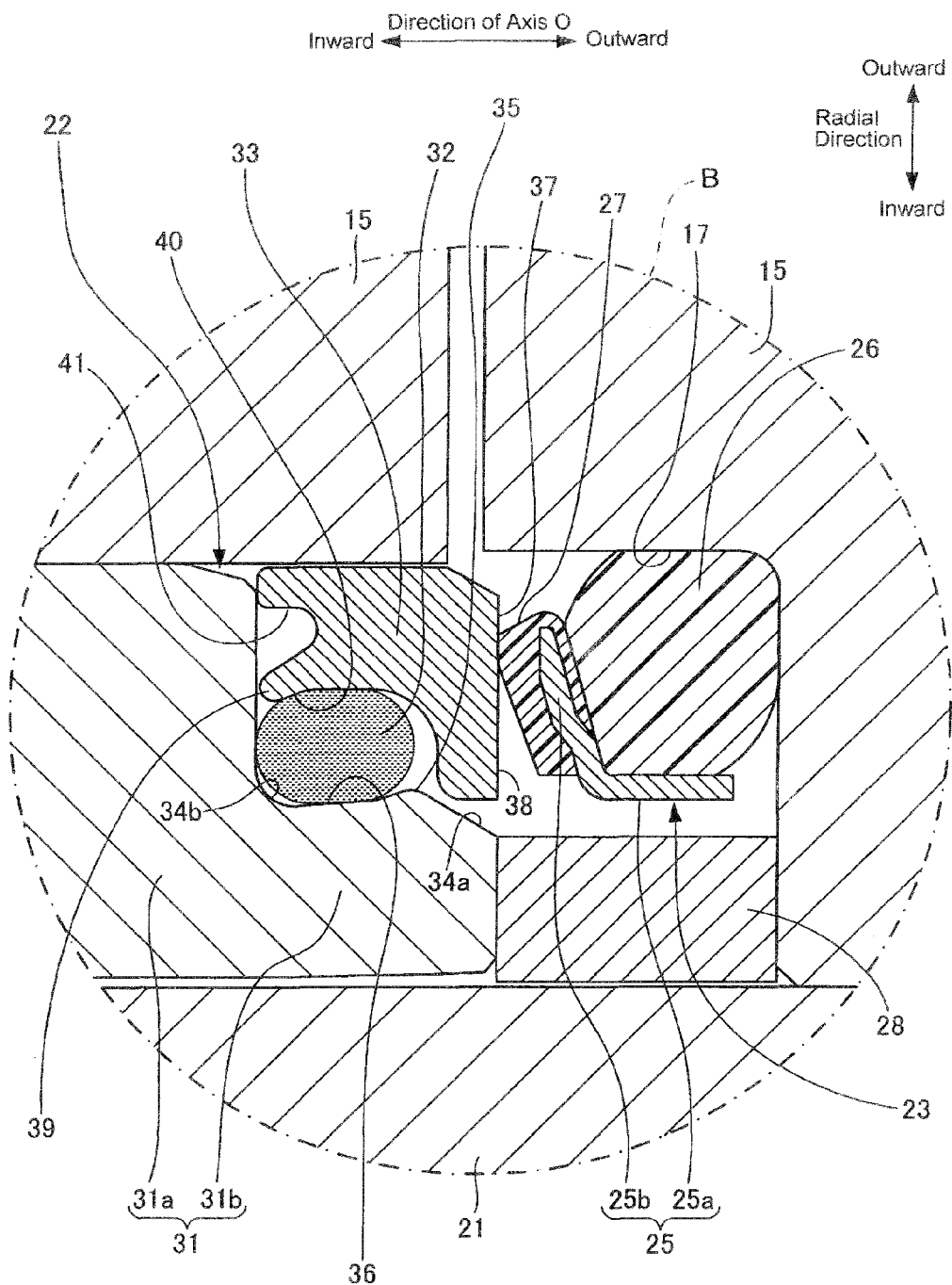
FIG. 4 is an enlarged view of part B in FIG. 3.

(Description of the Seal Member with Reference to FIG. 4)

As shown in FIG. 4, seal member 23 is formed by providing seal framework ring 25 with load ring 26 and seal body 27.

Seal framework ring 25 is formed of a metallic annular member having rigidity and is substantially L-shaped in section. This ring 25 includes cylindrical part 25*a* and flange 25*b* projecting radially outward from cylindrical part 25*a* to face crawler bushing 22.

Load ring 26 is formed of an annular elastic body, such as rubber, which can come into close contact with a corner where a bottom surface and a peripheral surface of counter bore 17 meet, and abuts on cylindrical part 25*a* of seal framework ring 25.

Seal body 27 is formed of an annular elastic body, such as rubber, which can abut on seal contact end face 37 of seal ring 33 (described later), and is integrally joined to flange 25*b* of seal framework ring 25.

Spacer 28 is interposed between the bottom surface of counter bore 17 and crawler bushing 22. This spacer 28 is formed of a ring-shaped member which has a predetermined thickness and can be mounted to the outer periphery of link pin 21. Spacer 28 has the function of stably keeping a space for appropriate storage of seal member 23 in counter bore 17 by specifying the position of crawler bushing 22 with respect to counter bore 17.

(Description of the Crawler Bushing with Reference to FIG. 3)

As shown in FIG. 3, crawler bushing 22 includes crawler bushing body 31 having a hollow part into which link pin 21 is inserted in a slidingly fit condition.

Crawler bushing body 31 includes large-diameter cylindrical part 31*a* defining an intermediate section of body 31 along axis O and small-diameter cylindrical parts 31*b* which are smaller in diameter than large-diameter cylindrical part 31*a* and define respective ends of body 31 along axis O.

Elastic ring 32 is mounted to an outer periphery of small-diameter cylindrical part 31*b* while butting against a radially extending end face of large-diameter cylindrical part 31*a* at a border between large-diameter cylindrical part 31*a* and small-diameter cylindrical part 31*b*.

Seal ring 33 is coupled to the outer periphery of small-diameter cylindrical part 31*b* through elastic ring 32.

(Description of the Elastic Ring with Reference to FIG. 3)

Elastic Ring 32 is an annular packing having O-shaped or circular section and is made of an elastic member such as rubber, and what is called an O-ring is adopted as elastic ring 32. This elastic ring 32 is inserted between small-diameter cylindrical part 31*b* of crawler bushing body 31 and seal ring 33 in a moderately compressed state by being given a certain squeeze, thereby performing the function of preventing the lubricant from leaking out from between crawler busing body 31 and seal ring 33.

(Description of the Small-Diameter Cylindrical Part of the Crawler Bushing Body with Reference to FIG. 4)

As shown in FIG. 4, a corner where the outer periphery and a leading end surface of small-diameter cylindrical part 31*b* of crawler bushing body 31 meet is chamfered, thus forming tapered surface 34*a* narrowing radially inward while extending outward along axis O. By pushing elastic ring 32 toward a base end of small-diameter cylindrical part 31*b* while fitting ring 32 onto this tapered surface 34*a* elastic ring 32 can more easily be mounted to small-diameter cylindrical part 31*b*.

The outer periphery of small-diameter cylindrical part 31*b* is provided with, in the axially inward direction (in the leftward direction in FIG. 4) starting from tapered surface 34*a* mountain-shaped projection 35, reverse tapered surface (first tapered surface) 36 and round chamfer 34*b* in this order.

Mountain-shaped projection 35 is formed adjacent to an axially inner edge of tapered surface 34*a* and projects radially outward for locking elastic ring 32.

Reverse tapered surface 36 is located axially internal to mountain-shaped projection 35 on the outer periphery of small-diameter cylindrical part 31*b* and spreads radially outward while extending outward along axis O. In other words, at a portion corresponding to reverse tapered surface 36, the diameter of small-diameter cylindrical part 31*b* increases as it extends axially outward (rightward in FIG. 4).

To round a corner bordering large-diameter cylindrical part 31*a* round chamfer 34*b* is formed at the axially innermost base end of small-diameter cylindrical part 31*b*. Providing this round chamfer 34*b* allows elastic ring 32 to fit perfectly to the base end of small-diameter cylindrical part 31*b*.

(Description of First Locking Means with Reference to FIG. 4)

Mountain-shaped projection 35 and reverse tapered surface (first tapered surface) 36 that are provided to small-diameter cylindrical part 31*b* of crawler bushing body 31 function as the first locking means which with their extremely simple structures, prevent elastic ring 32 from moving outward along axis O on small-diameter cylindrical part 31*b*.

(Description of the Seal Ring with Reference to FIG. 4)

As shown in FIG. 4, seal ring 33 is formed of a ring-shaped member having substantially the same outside diameter as large-diameter cylindrical part 31*a* of crawler bushing body 31. Material for this seal ring 33 is preferably corrosion-resistant metallic material such as stainless steel.

An outer end surface of seal ring 33 is seal contact end face 37 making contact with seal body 27 of seal member 23. It is preferable that this seal contact end face 37 is hardened by undergoing surface hardening such as carbonizing or induction hardening.

Seal ring 33 is formed with, at its outer end, flange 38 projecting radially inward to cover elastic ring 32 when viewed from outside the end face of crawler bushing 22.

Seal ring 33 is formed with, at its inner end, tongue-shaped projection 39 projecting radially inward to be locked by elastic ring 32.

Seal ring 33 has, at its inner periphery, reverse tapered surface (second tapered surface) 40 formed to connect with tongue-shaped projection 39. This reverse tapered surface 40 narrows radially inward while extending axially inward to be locked by elastic ring 32.

Seal ring 33 has circular groove 41 formed in its inner end surface.

(Description of Second Locking Means with Reference to FIG. 4)

Tongue-shaped projection 39 and reverse tapered surface 40 that are provided to seal ring 33 function as the second locking means which with their extremely simple structures, prevent seal ring 33 from moving outward along axis O. As mentioned earlier, elastic ring 32 is disposed between seal ring 33 and small-diameter cylindrical part 31*b* of crawler bushing body 31. Elastic ring 32 contacts axially inwardly located reverse tapered surface (second tapered surface) 40 of seal ring 33 as well as axially outwardly located reverse tapered surface (first tapered surface) 36 of small-diameter cylindrical part 31*b*.

(Description of a Sealing Function with Reference to FIG. 4)

The abutting relationship between seal contact end face 37 of seal ring 33 and seal body 27 of seal member 23 provides a seal between crawler bushing 22 and crawler link 15, thereby preventing the lubricant from leaking out.

Figure 5:
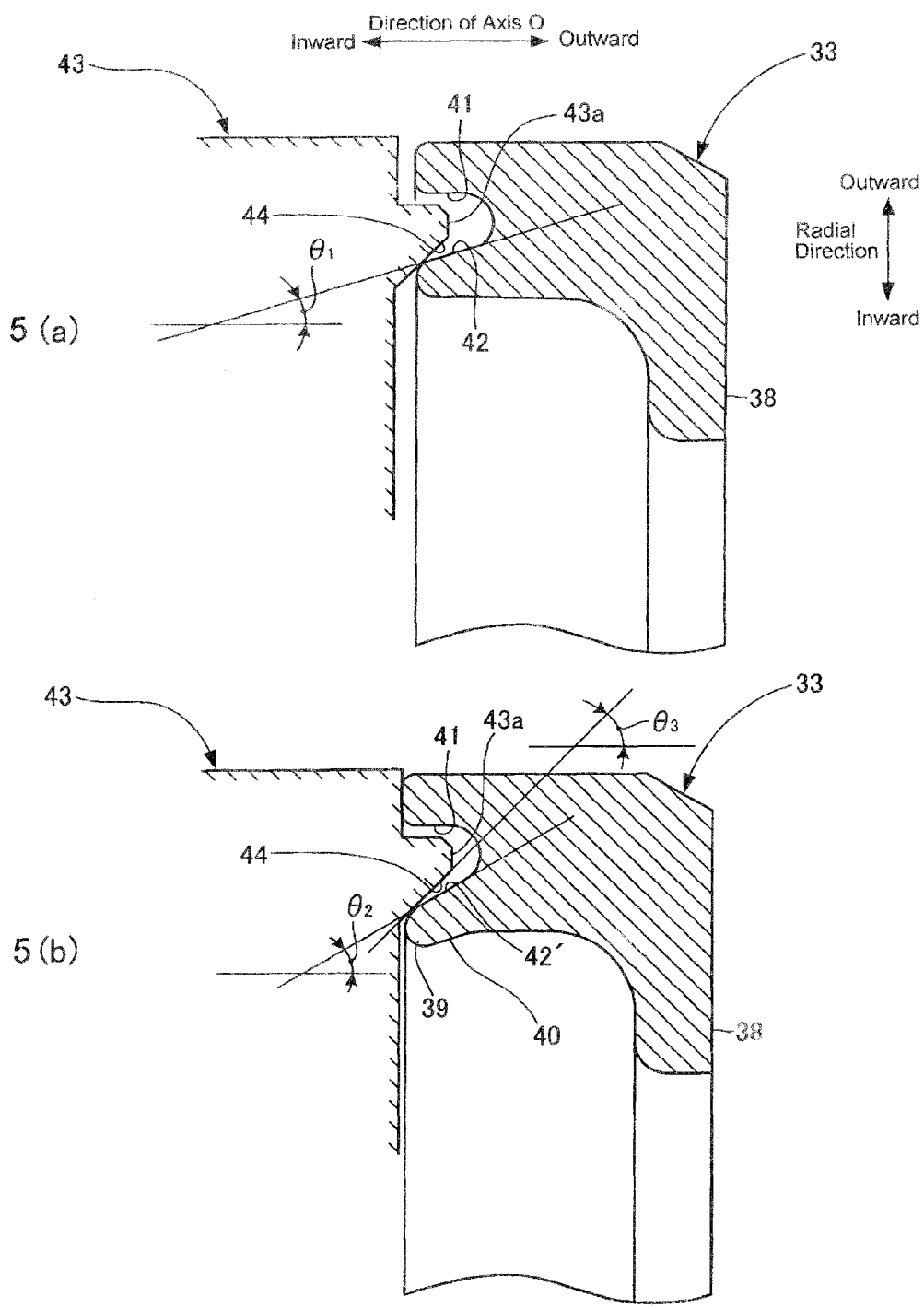
FIG. 5 illustrates a method of forming a tongue-shaped projection and a reverse tapered surface on a seal ring.

(Description of a Method of Forming the Tongue-Shaped Projection and the Reverse Tapered Surface on the Seal Ring with Reference to FIG. 5)

Groove 41 of seal ring 33 becomes a necessity for forming tongue-shaped projection 39 and reverse tapered surface 40 by press working.

FIG. 5(*a*) is a sectional view of an essential part of seal ring 33 before the press working is carried out.

Before the press working is carried out, groove 41 of seal ring 33 has, on its peripheral surface, tapered surface 42 narrowing radially inward at inclination angle $\theta_1$ while extending inward along axis O.

FIG. 5(*b*) is a sectional view of an essential part of seal ring 33 which underwent the press working.

After the press working is carried out, groove 41 of seal ring 33 has, on its peripheral surface, tapered surface 42' narrowing radially inward at inclination angle $\theta_2$ while extending inward along axis O. It is to be noted here that inclination angle $\theta_2$ is greater than inclination angle $\theta_1$.

The press working involves the use of punch 43. This punch 43 has engaging projection 43*a* for engagement in groove 41 of seal ring 33. Engaging projection 43*a* has tapered surface 44 narrowing radially inward at inclination angle $\theta_3$ while extending inward along axis O. It is to be noted here that inclination angle $\theta_3$ is greater than inclination angle $\theta_2$.

(FIG. 5 for a Reference Purpose)

To form tongue-shaped projection 39 and reverse tapered surface 40 on seal ring 33, as shown in FIG. 5(*a*), tapered surface 44 of engaging projection 43*a* of punch 43 is first brought into contact with tapered surface 42 of groove 41 in seal ring 33. Next, as shown in FIG. 5(*b*), punch 43 is moved outward along axis O at a specified feed rate through operation of a press machine (not shown), thereby pushing engaging projection 43*a* of punch 43 into groove 41 of seal ring 33. Accordingly, seal ring 33 is formed with tongue-shaped projection 39 which can be locked by elastic ring 32 at its inner end and reverse tapered surface 40 which can contact elastic ring 32 at predetermined inclination angle $\theta_2 - \theta_1$.

Tongue-shaped projection 39 and reverse tapered surface 40 may be provided in continuous form along the circumference of seal ring 33. Alternatively, tongue-shaped projections 39 and reverse tapered surfaces 40 may be provided in discontinuous form at a predetermined pitch along the circumference of seal ring 33. In cases where tongue-shaped projections 39 and reverse tapered surfaces 40 are provided in discontinuous form at the predetermined pitch along the circumference of seal ring 33, although a detailed explanation using a drawing is omitted, it goes without saying that engaging projections 43*a* of punch 43 may be provided correspondingly in circumferentially discontinuous form at a predetermined pitch.

(Description of Effects of the First Embodiment with Reference to FIG. 4)

In crawler bushing 22 of the first embodiment, the outward movement of elastic ring 32 along axis O is prevented by reverse tapered surface 36 and mountain-shaped projection 35 of crawler busing body 31. Moreover, the outward movement of seal ring 33 along axis O is prevented by reverse tapered surface 40 and tongue-shaped projection 39 of seal ring 33. Therefore, seal ring 33, together with elastic ring 32, is firmly secured to crawler busing body 31 even when seal ring 33 experiences resilience from elastic ring 32 in response to the squeeze. For this reason, seal member 23 can maintain a stable sealing function on a long-term basis without being pressed by excessive force of seal ring 33. When seal ring 33 experiences force (rightward force in FIG. 4) causing detachment of ring 33 from crawler bushing body 31, the force is propagated from reverse tapered surface (second tapered surface) 40 of seal ring 33 through elastic ring 32 to reverse tapered surface (first tapered surface) 36 of small-diameter cylindrical part 31*b*. In response, reactive force from reverse tapered surface 36 acts on seal ring 33 by way of the elastic ring, thereby securing seal ring 33 to crawler bushing body 31. In this way, seal ring 33 is stably held to the crawler bushing when used in the crawler belt.

(FIG. 4 for a Reference Purpose)

A sealing device constructed of seal member 23 and seal ring 33 has its service life often determined by wear of seal contact end face 37 of seal ring 33, rather than wear of seal body 27 of seal member 23. Thus, seal ring 33 needs replacement on an as needed basis or on a regular basis.

To effect the replacement of seal ring 33, seal ring 33 can be removed easily from crawler bushing body 31 by detaching seal ring 33 from crawler bushing body 31 against locking force of reverse tapered surface 36 and mountain-shaped projection 35 of crawler bushing body 31 or locking force of reverse tapered surface 40 and tongue-shaped projection 39 of seal ring 33 or a resultant of these two locking forces. Also, seal ring 33 can be mounted easily to crawler bushing body 31 by pushing seal ring 33 toward crawler bushing body 31 against the resilience from elastic ring 32 in response to the squeeze. In this way, maintenance for recovery of the sealing function can be carried out with ease.

(Second Exemplary Embodiment)

Figure 6:
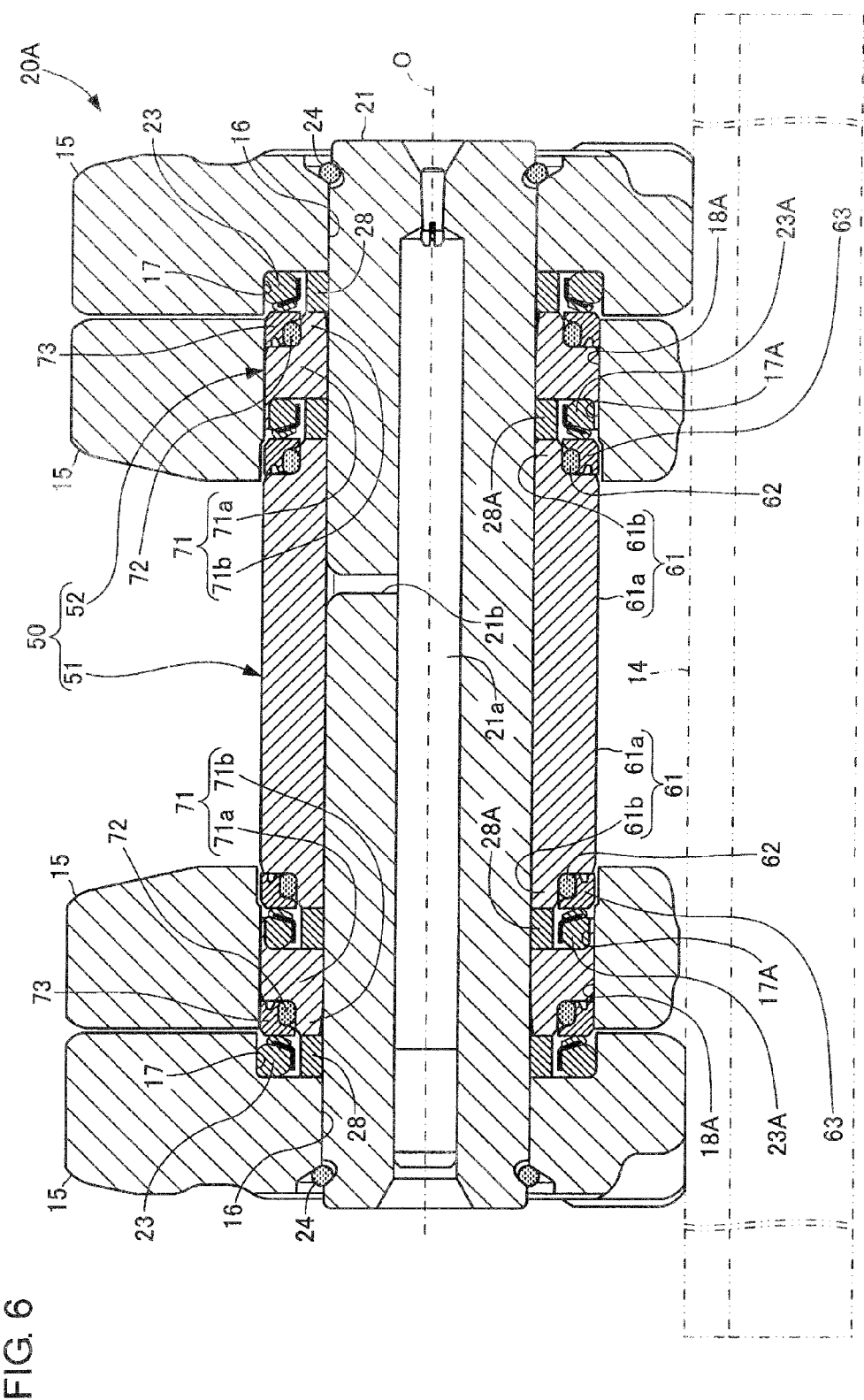
FIG. 6 is a structural illustration of a crawler bushing and a crawler link device in accordance with a second exemplary embodiment of the present invention.

FIG. 6 is a structural illustration of a crawler bushing and a crawler link device in accordance with the second exemplary embodiment of the present invention. It is to be noted that in the second embodiment described below, elements similar to those in the first embodiment have the same reference marks in the drawing, the detailed descriptions of those elements are omitted, and emphasis is placed on different features not seen in the first embodiment.

(Brief Description of a Rotary Crawler Bushing with Reference to FIG. 6)

Crawler link device 20A of the second embodiment relates to an example in which the rotary crawler bushing is adopted in crawler link device 20 of the first embodiment.

In the second embodiment, crawler bushing 50 corresponding to crawler bushing 22 of the first embodiment is a combination of first crawler bushing 51, which forms an intermediate section of crawler bushing 50 along axis O, and second crawler bushings 52 forming respective ends of crawler bushing 50 along axis O.

An established clearance is provided between bushing insertion hole 18A of one of the crawler links 15 overlapping each other at their respective ends (i.e., inner crawler link 15 in FIG. 6) and first crawler bushing 51. First crawler bushing 51 is rotatable relative to crawler link 15 and link pin 21 and is what is called the rotary crawler bushing.

As opposed to first crawler bushing 51, second crawler bushing 52 is press-fitted into bushing insertion hole 18A. A relatively small interference is set between bushing insertion hole 18A and second crawler bushing 52, so that second crawler bushing 52 cannot easily be inserted into and extracted from bushing insertion hole 18A.

(Description of the First Crawler Bushing with Reference to FIG. 6)

First crawler bushing 51 includes crawler bushing body 61 similar to crawler bushing body 31 of the first embodiment.

Crawler bushing body 61 includes large-diameter cylindrical part 61a defining an intermediate section of body 61 along axis O and small-diameter cylindrical parts 61b which are smaller in diameter than large-diameter cylindrical part 61a and define respective ends of body 61 along axis O.

Elastic ring 62 is mounted to an outer periphery of small-diameter cylindrical part 61b while butting against a stepped surface at a border between large-diameter cylindrical part 61a and small-diameter cylindrical part 61b.

Seal ring 63 is coupled to the outer periphery of small-diameter cylindrical part 61b through elastic ring 62.

Description of the Second Crawler Bushing with Reference to FIG. 6)

Second crawler bushing 52 includes crawler bushing body 71.

Crawler bushing body 71 includes large-diameter cylindrical part 71a defining an intermediate section along axis O and small-diameter cylindrical part 71b which is smaller in diameter than large-diameter cylindrical part 71a and defines an outer end of body 71 along axis O.

Counter bore 17A is formed at an inner end of large-diameter cylindrical part 71a of crawler bushing body 71.

Elastic ring 72 is mounted to an outer periphery of small-diameter cylindrical part 71b while butting against a stepped surface at a border between large-diameter cylindrical part 71a and small-diameter cylindrical part 71b.

Seal ring 73 is coupled to the outer periphery of small-diameter cylindrical part 71b through elastic ring 72.

Seal member 23A is inserted into counter bore 17A.

(FIG. 6 for a Reference Purpose)

It is to be noted here that large-diameter cylindrical parts 61a 71a, small-diameter cylindrical parts 61b 71b elastic rings 62, 72 and seal rings 63, 73 are similar to those (i.e., large-diameter cylindrical part 31a small-diameter cylindrical part 31b elastic ring 32 and seal ring 33) in the first embodiment.

(Description of a Spacer Between the First and Second Crawler Bushings with Reference to FIG. 6)

Spacer 28A is interposed between a bottom surface of counter bore 17A of second crawler bushing 52 and first crawler bushing 51. This spacer 28A is formed of a ring-shaped member which has a predetermined thickness and can be mounted to an outer periphery of link pin 21. Spacer 28A has the function of stably keeping a space for appropriate storage of seal member 23A in counter bore 17A by specifying the position of first crawler bushing 51 with respect to counter bore 17A.

(Description of Effects of the Second Embodiment with Reference to FIG. 6)

It goes without saying that the second embodiment provides the same effects as the first embodiment.

In addition, first crawler bushing 51 of the second embodiment is the rotary bushing, thereby advantageously reducing contact friction during engagement with sprocket 7 (see FIG. 1).

(Third Exemplary Embodiment)

Figure 7:
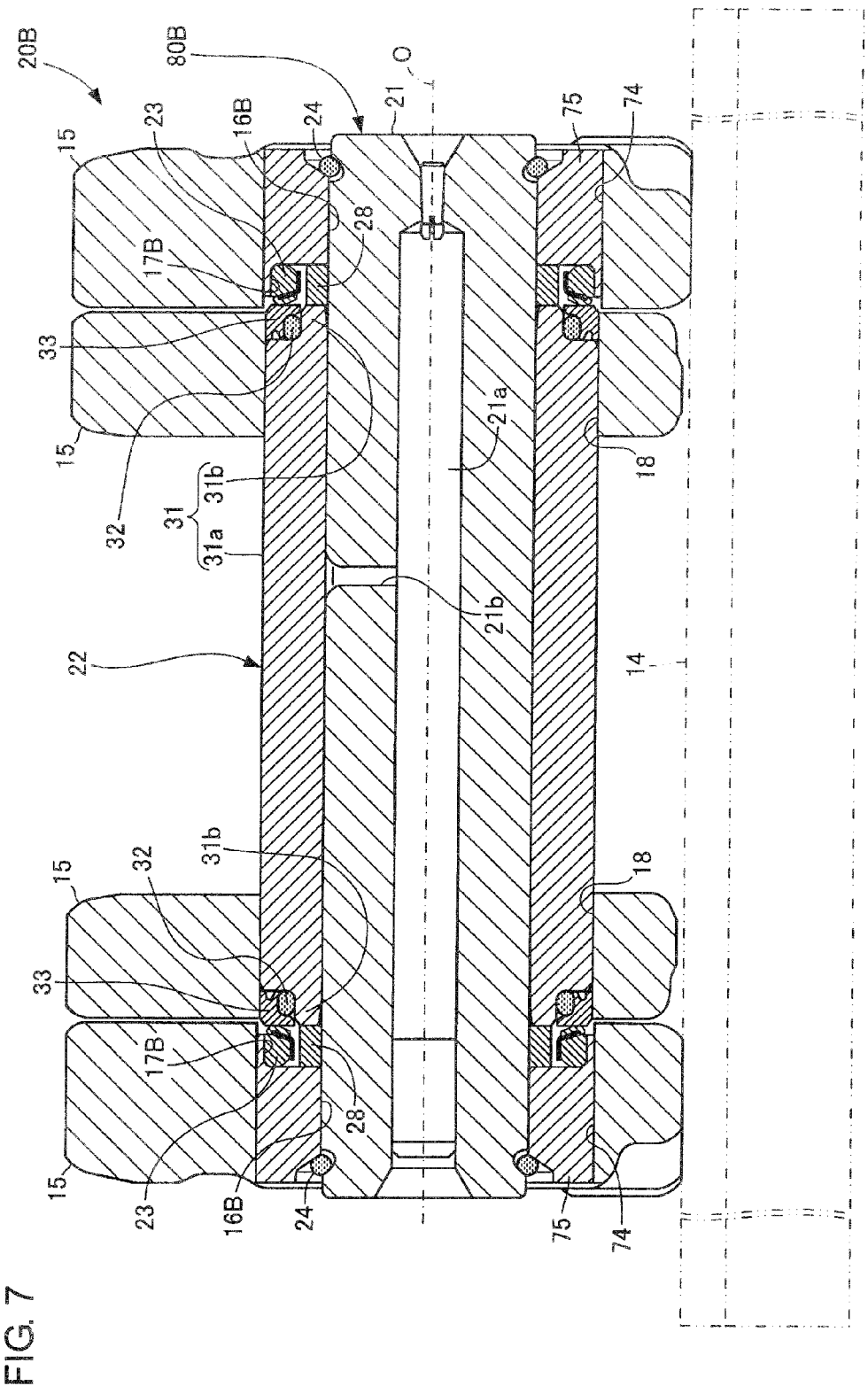
FIG. 7 is a structural illustration of a crawler bushing and a crawler link device in accordance with a third exemplary embodiment of the present invention.

FIG. 7 is a structural illustration of a crawler bushing and a crawler link device in accordance with the third exemplary embodiment of the present invention. It is to be noted that in the third embodiment described below, elements similar to those in the first embodiment have the same reference marks in the drawing, the detailed descriptions of those elements are omitted, and emphasis is placed on different features not seen in the first embodiment.

(Description of a Cartridge Pin with Reference to FIG. 7)

Crawler link device 20B of the third embodiment relates to an example in which the structure of the cartridge pin is adopted in crawler link device 20 of the first embodiment.

As shown in. FIG. 7, one of the crawler links 15 overlapping each other at their respective ends (i.e., outer crawler link 15 in FIG. 7) is formed with sleeve insertion hole 74 at its one end. Sleeve 75 is inserted into this sleeve insertion hole 74.

Sleeve 75 is formed with pin insertion hole 16B into which link pin 21 is inserted. Sleeve 75 is also formed with inwardly opening counter bore 17B which surrounds pin insertion hole 16B to be concentric with pin insertion hole 16B. Pin insertion hole 16B and counter bore 17B of sleeve 75 correspond, respectively, to pin insertion hole 16 and counter bore 17 of crawler link 15 in the first embodiment.

Metal elastic ring 24 is interposed between an end of link pin 21 and a rim of pin insertion hole 16B, thereby preventing leakage of a lubricant from between link pin 21 and sleeve 75.

In the third embodiment, cartridge pin 80B is constructed of link pin 21, crawler bushing 22, seal member 23, metal elastic ring 24, spacer 28 and sleeves 75. This cartridge pin 80B has the function of a connecting pin, the function of a bearing device and the function of a sealing device in combination.

(Description of Effects of the Third Embodiment with Reference to FIG. 7)

It goes without saying that the third embodiment provides the same effects as the first embodiment.

In the third embodiment, cartridge pin 80B is adopted. Inserting and extracting cartridge pin 80B correspond to inserting and extracting the connecting pin, the bearing device and the sealing device collectively. This provides an advantage that crawler belt 9 (see FIGS. 1 and 2) is connected and disconnected more efficiently.

(Fourth Exemplary Embodiment)

Figure 8:
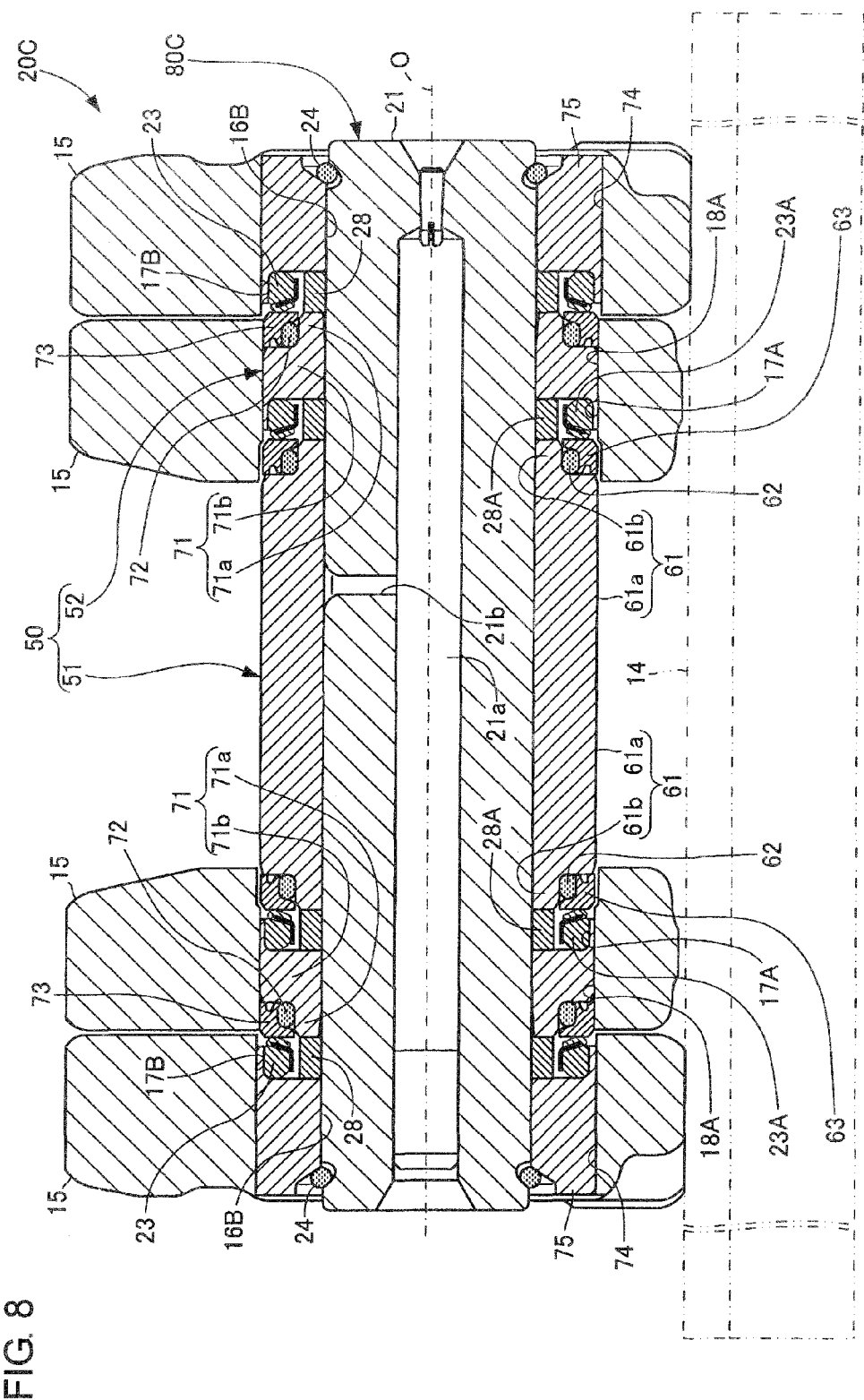
FIG. 8 is a structural illustration of a crawler bushing and a crawler link device in accordance with a fourth exemplary embodiment of the present invention.

FIG. 8 is a structural illustration of a crawler bushing and a crawler link device in accordance with the fourth exemplary embodiment of the present invention. It is to be noted that in the fourth embodiment described below, elements similar to those in each of the first, second and third embodiments have the same reference marks in the drawing, the detailed descriptions of those elements are omitted, and emphasis is placed on different features not seen in those embodiments, (Description of a Cartridge Pin with Reference to FIG. 8)

Crawler link device 20C of the fourth embodiment relates to an example in which the structure of the rotary crawler bushing and the structure of the cartridge pin are adopted by combining crawler link device 20A of the second embodiment with the crawler link device of the third embodiment.

In the fourth embodiment, cartridge pin 80C is constructed of link pin 21, first crawler bushing 51, second crawler bushing 52, seal members 23, 23A, metal elastic ring 24, spacers 28, 28A and sleeves 75. This cartridge pin 80C, too, has the function of a connecting pin, the function of a bearing device and the function of a sealing device in combination.

(Description of Effects of the Fourth Embodiment with Reference to FIG. 8)

It goes without saying that the fourth embodiment provides the same effects as the first embodiment.

In addition, the fourth embodiment provides a combination of the effects of the second and third embodiments. In other words, the fourth embodiment enables reduction of contact friction during engagement with sprocket 7 (see FIG. 1) and can improve efficiency in connecting and disconnecting crawler belt 9 (see FIGS. 1 and 2).

The embodiments of the crawler bushing and the crawler link device according to the present invention have been described above. However, the present invention is not limited to the structures described in the above embodiments and allows appropriate variations on each of the structures without departing from its spirit, such as, appropriately combining the structures of the foregoing embodiments.

Figure 9:
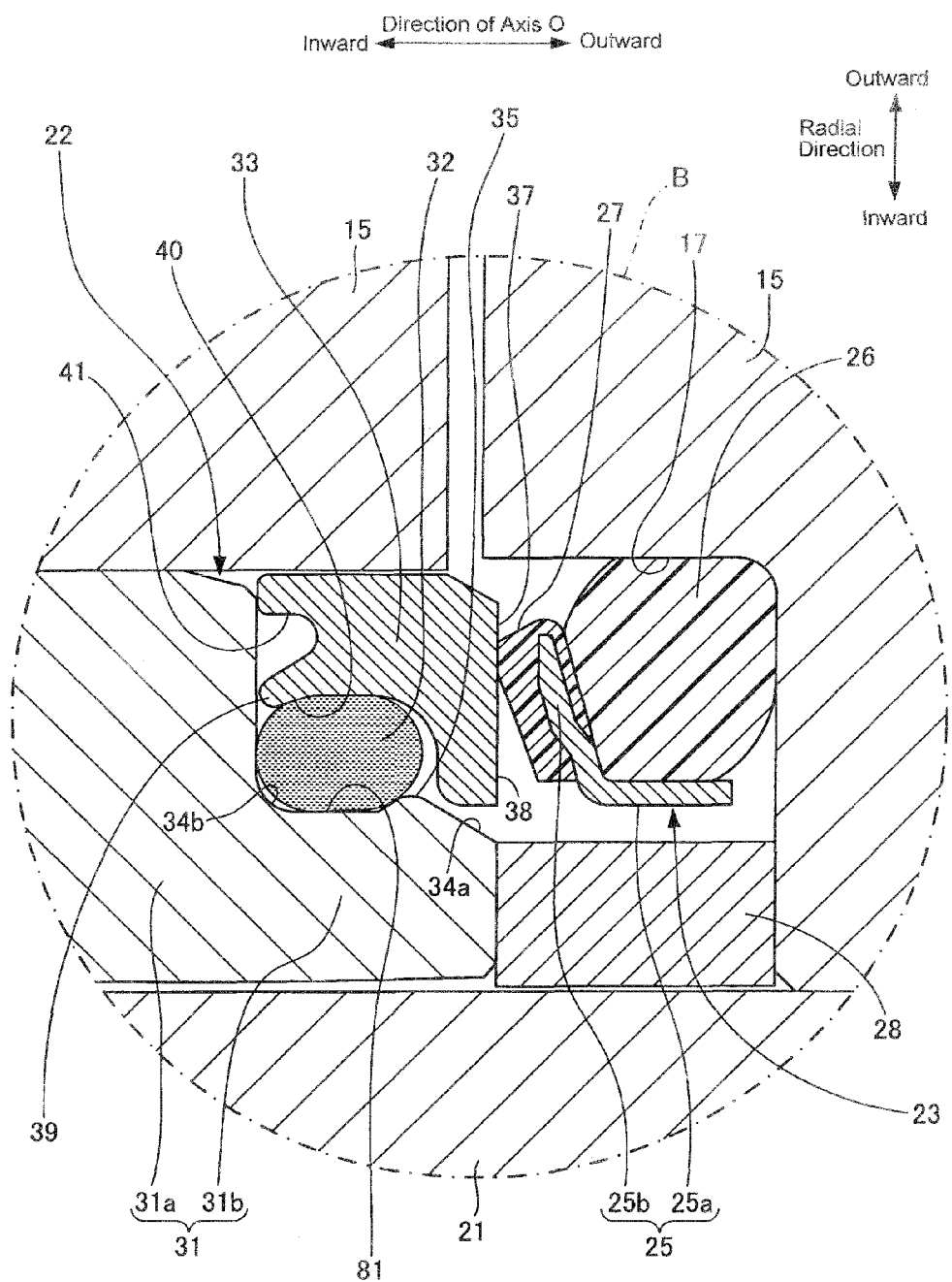
FIG. 9 illustrates a variation.
Figure 10:
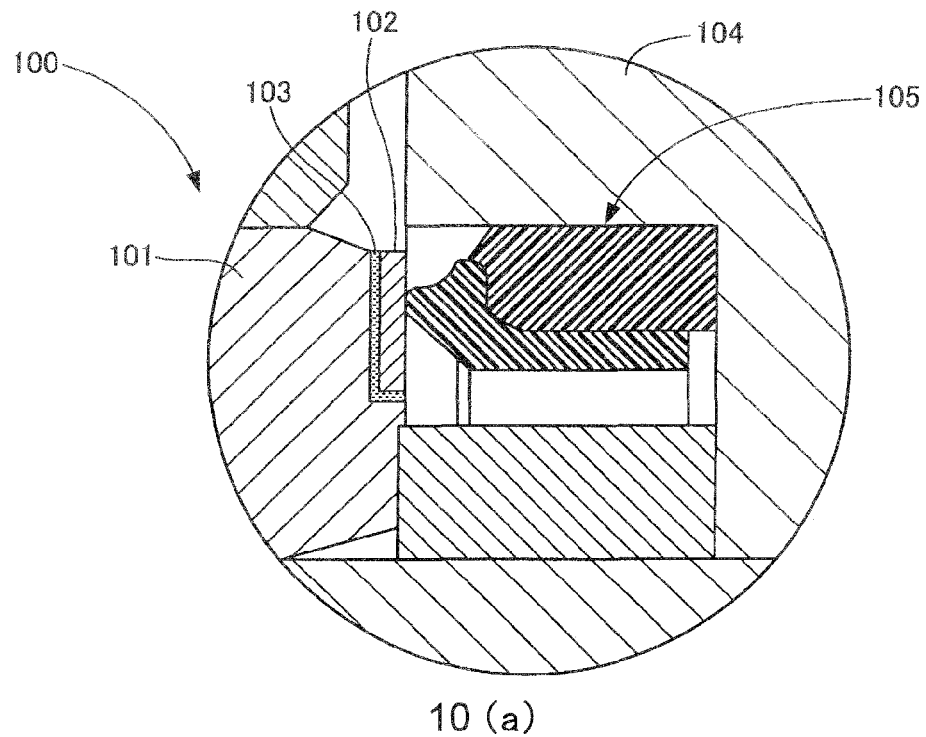
FIG. 10 illustrates prior arts.
Figure 10:
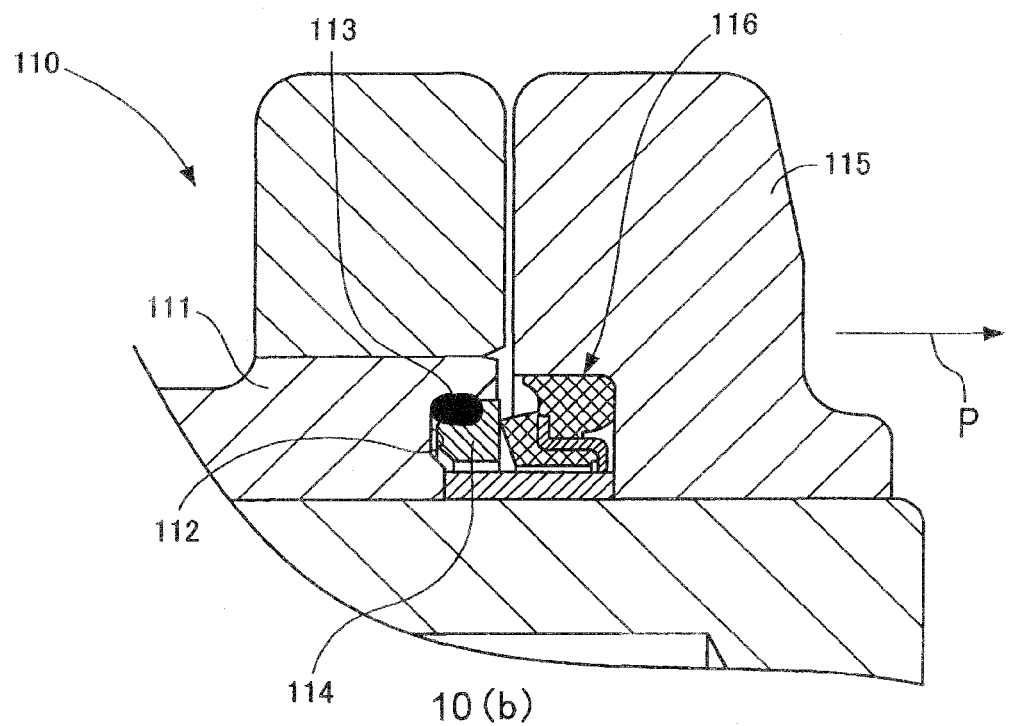

(Description of a Variation with Reference to FIGS. 4 and 9)

The foregoing embodiments have given the example in which mountain-shaped projection 35 and reverse tapered surface 36 are adopted as the first locking means as shown in FIG.4. However, the present invention is not limited to this example and can adopt, for example, the following structure. As shown in FIG. 9, with only mountain-shaped projection 35 provided, flat surface 81 parallel to axis O is adopted, and an axially inner reverse tapered surface of mountain-shaped projection 35 functions as a first tapered surface.

Industrial Applicability

A crawler bushing and a crawler link device according to the present invention have the capability of maintaining a sealing function stably on a long-term basis as well as the capability of permitting easy maintenance for recovery of the sealing function and therefore, are suitable for use as components of a crawler belt mounted to a work vehicle such as a bulldozer or a hydraulic excavator.

Description of Reference Marks in the Drawings
1 bulldozer
15 crawler link
20, 20A, 20B, 20C crawler link devices
21 link pin
22, 50 crawler bushings
23, 23A seal members
31, 61, 71 crawler bushing bodies
31*a*61*a*71*a*large-diameter cylindrical parts
31*b*61*b*71*b*small-diameter cylindrical parts
32, 62, 72 elastic rings
33, 63, 73 seal rings
35 mountain-shaped projection (first locking means)
36 reverse tapered surface (first tapered surface)
37 seal contact end face
39 tongue-shaped projection (second locking means)
40 reverse tapered surface (second tapered surface)
41 groove
51 first crawler bushing
52 second crawler bushing

The invention claimed is:

1. A crawler bushing assembly having a seal contact end face to be in contact with a seal member disposed axially adjacent to the crawler bushing assembly, wherein the crawler bushing assembly includes:
a crawler bushing body having a large-diameter cylindrical part defining an axially intermediate section of the crawler bushing body and a small-diameter cylindrical part having a smaller diameter than that of the large-diameter cylindrical part and defining an axially end section of the crawler bushing body;
an elastic ring mounted to an outer periphery of the small-diameter cylindrical part;
a seal ring attached to the small-diameter cylindrical part through the elastic ring, the seal ring being formed with the seal contact end face at an outer end thereof;
first locking means for preventing the elastic ring from moving outward along an axis on the small-diameter cylindrical part;
second locking means for preventing the seal ring from moving outward along the axis on the small-diameter cylindrical part, the second locking means being formed by providing a circumferentially extending groove in an inner end surface of the seal ring,
wherein the second locking means comprises a tongue-shaped projection that is radially inward of the groove and projects radially inward to be locked by the elastic ring, and a tapered surface connected with the tongue-shaped projection, the tapered surface narrowing radially inward while extending axially inward on an inner periphery of the seal ring.

2. The crawler bushing assembly according to claim 1, wherein the first locking means comprises a tapered surface on the outer periphery of the small-diameter cylindrical part, the tapered surface spreading radially outward while extending axially outward.

3. The crawler bushing assembly according to claim 2, wherein the first locking means further comprises a projection at an outer end portion of the small-diameter cylindrical part, the projection projecting radially outward for locking the elastic ring.

4. The crawler bushing assembly according to claim 3, wherein an outside diameter of the seal ring is substantially equal to an outside diameter of the large-diameter cylindrical part.

5. A crawler link device comprising:
crawler links overlapping each other at respective ends thereof and coupled to each other by means of a link pin and the crawler bushing assembly according to claim 4, which are disposed coaxially, and
the seal member, which is inserted to be axially adjacent to the crawler bushing assembly.

6. A crawler link device comprising:
crawler links overlapping each other at respective ends thereof and coupled to each other by means of a link pin and the crawler bushing assembly according to claim 3, which are disposed coaxially, and
the seal member, which is inserted to be axially adjacent to the crawler bushing assembly.

7. The crawler bushing assembly according to claim 2, wherein an outside diameter of the seal ring is substantially equal to an outside diameter of the large-diameter cylindrical part.

8. A crawler link device comprising:
crawler links overlapping each other at respective ends thereof and coupled to each other by means of a link pin and the crawler bushing assembly according to claim 7, which are disposed coaxially, and
the seal member, which is inserted to be axially adjacent to the crawler bushing assembly.

9. A crawler link device comprising:
crawler links overlapping each other at respective ends thereof and coupled to each other by means of a link pin and the crawler bushing assembly according to claim 2, which are disposed coaxially, and
the seal member, which is inserted to be axially adjacent to the crawler bushing assembly.

10. The crawler bushing assembly according to claim 1, wherein the first locking means comprises a projection at an outer end portion of the small-diameter cylindrical part, the projection projecting radially outward for locking the elastic ring.

11. The crawler bushing assembly according to claim 10, wherein an outside diameter of the seal ring is substantially equal to an outside diameter of the large-diameter cylindrical part.

12. A crawler link device comprising:
crawler links overlapping each other at respective ends thereof and coupled to each other by means of a link pin and the crawler bushing assembly according to claim 11, which are disposed coaxially, and
the seal member, which is inserted to be axially adjacent to the crawler bushing assembly.

13. A crawler link device comprising:
crawler links overlapping each other at respective ends thereof and coupled to each other by means of a link pin and the crawler bushing assembly according to claim 10, which are disposed coaxially, and
the seal member, which is inserted to be axially adjacent to the crawler bushing assembly.

14. The crawler bushing assembly according to claim 1, wherein an outside diameter of the seal ring is substantially equal to an outside diameter of the large-diameter cylindrical part.

15. A crawler link device comprising:
crawler links overlapping each other at respective ends thereof and coupled to each other by means of a link pin and the crawler bushing assembly according to claim 14, which are disposed coaxially, and
the seal member, which is inserted to be axially adjacent to the crawler bushing assembly.

16. A crawler link device comprising:
crawler links overlapping each other at respective ends thereof and coupled to each other by means of a link pin and the crawler bushing assembly according to claim 1, which are disposed coaxially, and
the seal member, which is inserted to be axially adjacent to the crawler bushing assembly.

\* \* \* \* \*